United States Patent Office 2,710,048
Patented June 7, 1955

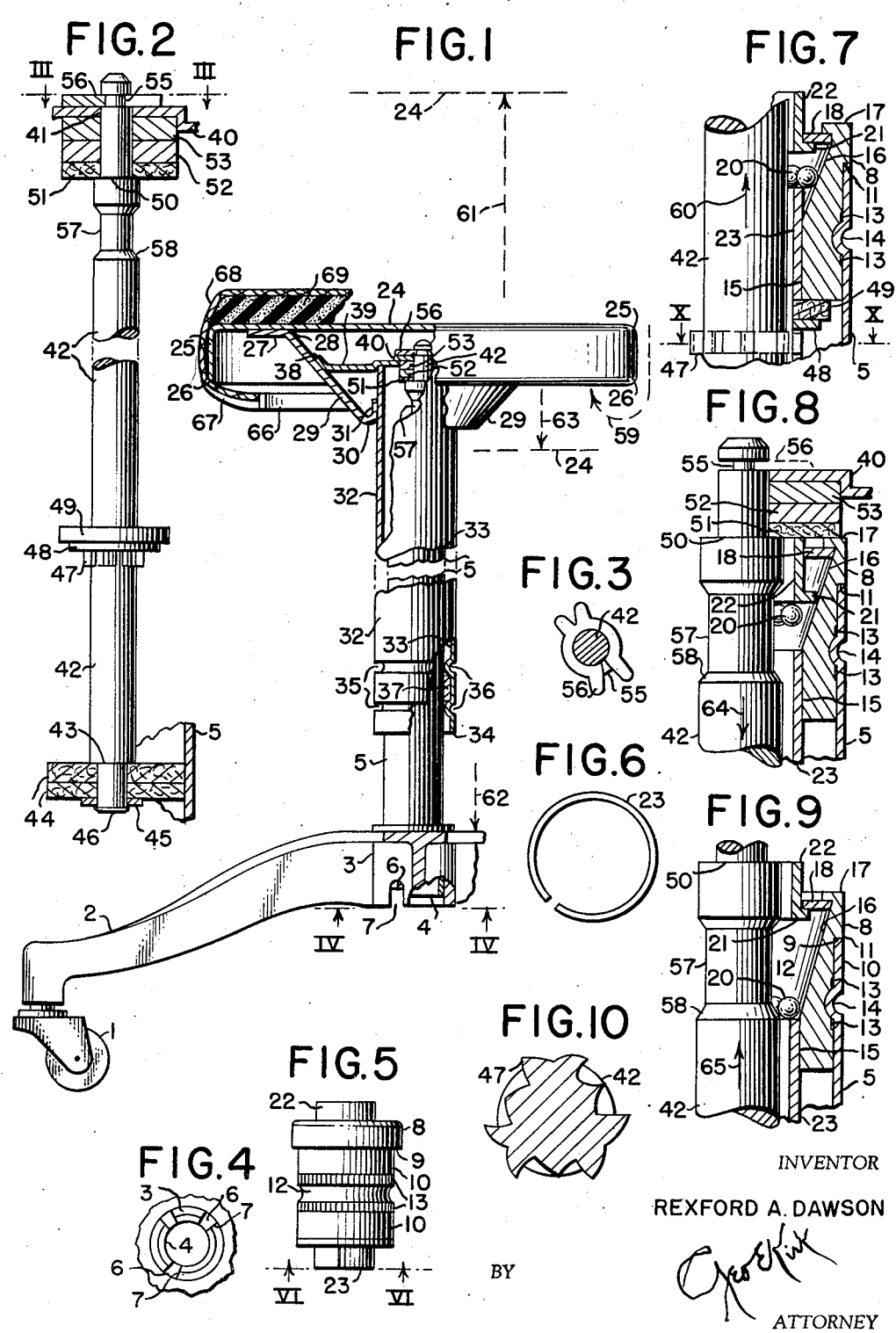

2,710,048

FURNITURE LEGS

Rexford A. Dawson, Toledo, Ohio

Application January 13, 1953, Serial No. 330,950

1 Claim. (Cl. 155—94)

This invention relates to tubular leg structures.

This invention has utility when incorporated in table, chair and stool types of supports, even of pedestal type, for quiet control and clean operation, with avoidance of wobble.

Referring to the drawings:

Fig. 1 is a side elevation, with parts broken away, in a pedestal stool, with suggested ranges for adjustment;

Fig. 2 is a fragmentary side elevation of the seat-carried stem or shaft in the automatic control;

Fig. 3 is a section on the line III—III, Fig. 2, of the embracing split key assembly of the stem with the seat;

Fig. 4 is a bottom plan view from the line IV—IV, Fig. 1, of the anchoring with the stool base of the complementary tube in the automatic control, which tube is about the stem;

Fig. 5 is a detail in side elevation of the upper terminal housing for the tube having the effective ball clutch to engage and release the stem in controlling seat adjustments;

Fig. 6 is a bottom plan view from the line VI—VI, Fig. 5, of the friction-located split sleeve, which is thrust into the ball clutch housing at the upper seat limit to release the clutch;

Fig. 7 is a fragmentary detail of the ball clutch release by the split sleeve at the stem upper limit in the tube;

Fig. 8 is a view similar to Fig. 7, but at the down limit position of the stem in the sleeve in clutch release;

Fig. 9 is clutch ball resetting view from Fig. 8 for free up pull of the shaft and down starting clutch setting; and Fig. 10 is a section on the line X—X, Fig. 7, showing stem integral stops for abutment at clutch release.

*The base*

Swivel casters 1 are on diverging arms 2 of a furniture base having a central sleeve 3 into which is forced lower end 4 of a tube or element 5. Supplementing the drive fit anchorage of the tube 5 in the base sleeve 3, diametric lugs 6 from the end 4 of the tube 5 are offset into notches 7 of the base sleeve 3 lower end. The sleeve 5 is thus rigidly anchored in upstanding position from the stool base.

*The clutch housing mounting*

A clutch housing 8 is a cap for the tube 5. A shoulder 9 provides an upper end for a generally cylindrical body portion 10 of the housing 8 (Fig. 5), against which shoulder 9, end 11 of the tube 5 abuts. Intermediate the body portion 10 of the housing 8, there is a groove 12 bounded by a pair of parallel kerfed or roughened regions 13. By spinning or pressing a groove 14 of the tube 5 into the groove 12 of the housing 8, there is a positive assembly in fixed keyed relation, for there is supplemental holding due to the kerfs 13 having the tube 5 inner face as adjacent the groove 14, embedding with the tube 5 inner face.

*Sleeves for shifting the clutch balls*

The housing 8 is tubular with a cylindrical lower portion 15 to an outwardly tapering conical clutch face or seat 16 extending upwardly to an end flange 17, spun or pressed over a ring or washer 18. Before the placement of the ring 18, an annular series of balls 20 is disposed in the region of the clutch face 16. Upwardly from such series of balls 20 is a flange end 21 of a sleeve 22 adapted to be generally free to slide as to the housing 8 toward contacting the face 16. In the housing 8, oppositely from the sleeve 22 is a split friction sleeve 23 expanded normally to hold thrust relation with the cylindrical portion 15 of the housing 8. Upon thrusting of the sleeve 23 upward into the housing 8, the clutch balls 20 are caused to ride upward on the conical face 16 and clear of clutching position.

*Furniture section and depending elements*

A stool seat is herein shown of sheet metal disk top 24 with a drop outer flange 25 to an inturned or beaded lower edge 26. This is a rigid light weight construction, further reinforced by a flange 27 having spot weld connection 28 with the under face of the top 24. A downwardly tapering conical section 29 from the flange 27 is to a return bend 30 having a weld connection flange 31 to an outer tube or guide element 32 concentric of the tube 5 and with some clearance 33 therebetween (Fig. 1). Partially across its clearance 33 near lower end 34 of the tube 32 is a pair of parallel grooves 35 forming internal ribs 36 effective to anchor a compressible packing ring 37 in relative lateral-shifting-take-up relation between the outer tube 32 and the intermediate member or tube 5.

Weld-connected flange 38 (Fig. 1) to intermediate portion of the conical section 29 positions a disk 39 parallel to and below the seat top 24. Concentrically of the tube 32, the disk 39 has a seat 40 to an opening 41 (Fig. 2). Mounting provision is thus provided for internal coaxial clutch region complementary means.

A shaft or stem element 42 (Fig. 2) has a reduced diameter portion 43 adjacent its lower end whereon is placed concentric guiding leather means or packing disks 44 held by a washer 45 and riveted end 46 of the shaft 42, to ride snugly against the inner wall of the tube 5 toward the base 3.

An adjustment region limit for the clutch along the stem or shaft 42 is determined by scarfings 47 against the upper side of which may ride loosely on the shaft 42 a washer 48 as a support for a sound-deadening abutment buffer 49, say of leather, for up limit adjustment limit (Figs. 2, 7).

Near the upper end of the shaft 42 is a reduced diameter region 50 against which seats a down adjustment limit abutment or sound deadening cushioning stop 51.

Resting on the packing disk 51 is a self-lubricated or oil impregnated metal bearing disk 52 against the upper side of which rests a complementary similar bearing disk 53 normally snugly fitting in the seat 40. The seat 40 has the central opening 41 to embrace the reduced region 50 of the shaft 42 (Figs. 2, 8). A groove 55 in the shaft 42, provides a seat for Y-key 56 to ride snugly against the outer face of the seat 40 and thus provide frictional holding for the anti-friction bearing 53 at a swivel joint with the bearing 52 for the bearing 53 to be held with the stool top 24 in turning relatively to the shaft 42 when the clutch balls 20 are engaged with the stem 42.

*Clutch controls*

As the stop 51 provides a limit for down thrust of the stem or shaft 42 into the upstanding tube 5, it is struck by the sleeve 22, held by the flange 21 from full out-travel. The in-travel is for the flange 21 to push the clutch balls 20, as such may be in gripping engagement with the taper face 16, to be moved downward. At this region of the shaft 42, there is a reduced diameter region 57, into which the released balls 20 may enter (Fig. 8). Positive course is thus had for the release of the clutch for seat 24 to be lifted and with wedge face 58 to direct the balls 20 outward to ride along the taper face 16 and at once there be down pressure on the seat 24, for the cylindrical face of the full diameter of the shaft 42 to cause the balls 20 to grip the face 16 for positive clutch holding at the seat position.

From an intermediate position, seat 24 up-pull, arrow 59, Fig. 1, releases the clutch for a higher stool setting, as there may then be down load thereon. At up-pull limit, arrow 60 for the stem 42, (Fig. 7) brings the seat 24 to the region of arrow 61 (Fig. 1). Downholding at arrow 62 (Fig. 1) insures that the frictionally held sleeve 23 effects clutch release, for the seat 24 down-settling as shown by arrow 63 (Fig. 1), and arrow 64 (Fig. 8), so that re-adjustment for height setting, arrow 65 (Fig. 9) may occur.

While the light weight metal article of furniture, herein shown as a stool, has wide range of industrial placement, even for such locations as well as office or domestic work, an extensible band 66 may pucker in as a sort of draw string a depending skirt portion 67 of a fabric jacket 68 for a sponge rubber pad 69, in thereby contributing much to the appearance, as well as in-use comfort for stool use.

The disclosure involves a minimum number of machined parts. Readiness for accurate assembly follows from the sheet metal stamped out and die formed tubular portions. The stem 42 from the stool seat, notwithstanding it is swivel connected therewith, is the central concentric member in the functioning of the clutch. The cone 29 has reinforcement medially of its rise at the disk 39. The seat disk 24 has the flange 27 as an additional factor in the light weight construction reinforcement, further centralized by the flange 31 to the tube 32, with a second connection or weld 70 at the upper end of the tube 32 with the disk 39. While it would seem that the seat 40 may be subject to strain action, such is minimized, if not eliminated due to the packing disks 44 maintaining centralizing relation for the stem 42 in the tube 5, supplemented by the packing ring 37 holding of the outer tube 32 coaxial with the stem 42. The press-fit sleeve connection of the stem 5 with the base region 3 has its area anchorage as to the face of the stem 5 therein supplemented by the offsets 6 wedged into the notch means 7 of the base.

There is minimum material mass at the respective sound-deadening and oppositely effective abutments 49, 51. Their action is local to the respective sleeves in the clutch housing.

What is claimed and it is desired to secure by Letters Patent is:

In a furniture leg structure, a base, an upwardly extending tube fixed with the base, a downward inwardly tapering clutch seat providing housing anchored with the upper end of the tube, a furniture section, a depending stem concentrically entering the tube, said stem having swivel connection with the section in providing complementary clutch seat as to the housing clutch seat, clutch balls coacting between the seats, a first sleeve downwardly shiftable into the housing to shift the balls relatively to the clutch seats, said balls coacting at locking position to hold the base with the stem and leaving the section free to turn relatively thereto at the swivel connection, a second sleeve upwardly shiftable into the housing from below the balls to disengage the balls from clutch locking of the stem with the base for effective leg length adjustment, and resonance absorbing impact means fixed with the stem and carried in said adjustment toward selectively impinging said sleeves for section height positioning, said impact means for the second sleeve providing packing between the stem and tube in coacting for wear looseness avoidance in maintained quiet smooth operation in use.

References Cited in the file of this patent

UNITED STATES PATENTS

| | | |
|---|---|---|
| 909,223 | Reynolds | Jan. 12, 1909 |
| 1,075,323 | Benjamins | Oct. 14, 1913 |
| 1,194,551 | Schossler | Aug. 15, 1916 |
| 1,270,977 | Schade | July 2, 1918 |
| 1,425,582 | Feigler | Aug. 15, 1922 |
| 2,295,281 | Grunwald | Sept. 8, 1942 |
| 2,338,783 | Romeo | Jan. 11, 1944 |
| 2,364,191 | Campbell | Dec. 5, 1944 |
| 2,469,896 | Shaef | May 10, 1949 |
| 2,638,969 | Restivo | May 19, 1953 |